US009618414B2

United States Patent
Klopf et al.

(10) Patent No.: US 9,618,414 B2
(45) Date of Patent: Apr. 11, 2017

(54) DEVICE FOR DETERMINING A PRESSURE AND METHOD FOR MANUFACTURING THE SAME

(71) Applicant: Robert Bosch GmbH, Stuttgart (DE)

(72) Inventors: Frank Klopf, Munich (DE); Thomas Moelkner, Stuttgart (DE); Wilhelm Frey, Stuttgart (DE); Marc Layer, Reutlingen (DE); Juergen Kober, Karlsruhe (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/074,860

(22) Filed: Mar. 18, 2016

(65) Prior Publication Data

US 2016/0299027 A1    Oct. 13, 2016

(30) Foreign Application Priority Data

Apr. 10, 2015   (DE) .................. 10 2015 206 468

(51) Int. Cl.
*G01L 7/08*      (2006.01)
*G01D 11/24*     (2006.01)
*G01L 19/14*     (2006.01)
*B23K 31/02*     (2006.01)

(52) U.S. Cl.
CPC .............. *G01L 19/14* (2013.01); *B23K 31/02* (2013.01)

(58) Field of Classification Search
CPC .............................. G01D 11/24; G01D 11/245
USPC ........................................................... 73/431
See application file for complete search history.

(56) References Cited

U.S. PATENT DOCUMENTS

| 2005/0252299 | A1* | 11/2005 | Oda | G01L 9/006 73/715 |
| 2007/0006641 | A1* | 1/2007 | Wiedemann | G01L 23/18 73/114.18 |
| 2007/0095145 | A1* | 5/2007 | Sato | G01L 19/0038 73/716 |
| 2012/0174682 | A1* | 7/2012 | Rozgo | G01L 19/0007 73/727 |
| 2013/0214369 | A1* | 8/2013 | Jones | G01L 19/147 257/419 |
| 2015/0247774 | A1* | 9/2015 | Wagner | G01F 1/34 324/691 |
| 2016/0076960 | A1* | 3/2016 | Sato | B21J 5/08 73/723 |

FOREIGN PATENT DOCUMENTS

| DE | 10 2009 025 486 | | 1/2011 | |
| DE | 102009025486 A1 | * | 1/2011 | ............. G01L 23/18 |
| DE | 102010061322 A1 | * | 6/2012 | ........... G01L 9/0051 |

* cited by examiner

*Primary Examiner* — Lisa Caputo
*Assistant Examiner* — Jamel Williams
(74) *Attorney, Agent, or Firm* — Gerard Messina

(57) ABSTRACT

A device for determining a pressure and a method for manufacturing the same, having a housing including a cavity, a sensor device including a first sealing structure which engages with the housing so that an opening of the cavity is closable with the aid of the sensor device, in which the sensor device is configured for determining a pressure which is applied to the cavity, and a sealing device situated between the housing and the sensor device and configured for pressing the first sealing structure on the housing by exerting a contact force on the sensor device.

9 Claims, 6 Drawing Sheets

DEVICE FOR DETERMINING A PRESSURE AND METHOD FOR MANUFACTURING THE SAME

RELATED APPLICATION INFORMATION

The present application claims priority to and the benefit of German patent application no. 10 2015 206 468.9, which was filed in Germany on Apr. 10, 2015, the disclosure of which is incorporated herein by reference.

FIELD OF THE INVENTION

The present invention relates to a device for determining a pressure and a method for manufacturing a device for determining a pressure. In particular, the present invention relates to a pressure sensor, which may be a high-pressure sensor. A high-pressure sensor is understood to be a sensor which is configured for the purpose of determining a pressure above 2000 bar, which may be above 2500 bar, particularly which may be above 3000 bar, in which the high-pressure sensor may not be destroyed. 1 bar corresponds to 10,000 Pascals.

BACKGROUND INFORMATION

In hydraulics and in many areas of process technology, pressure sensors, i.e., devices for determining pressures, in particular pressures above 50 bar, play a large role. In automotive engineering in particular, devices of this type are used in different systems, for example, in the fuel direct injection and the electronic stability programs. Usually, so-called piezoresistive high-pressure sensors are used here, which have a particular accuracy and robustness, and are manufacturable at relatively low cost.

In the case of piezoresistive pressure sensors, strain-sensitive electrical resistors are located on a suitably configured steel diaphragm and interconnected to form a Wheatstone bridge. A pressure to be determined is applied to the steel diaphragm and causes deformations of the steel diaphragm. Thus, material strains of the resistors on the surface of the diaphragm may occur. The resistors are situated in such a way that these strains or compressive strains are detectable. A resulting detuning of the Wheatstone bridge, which is also called a resistance bridge, is at small diaphragm deflections of the steel diaphragm proportional to the applied pressure and may be evaluated by suitable electronics.

Patent document DE 10 2009 025 486 A1 discusses a two-part pressure sensor, whose two parts are fixed to one another by a weld seam. The first part is a housing including an outer thread which does not come into contact with the fluid whose pressure is to be determined. The second part includes a measured section, whose deformation is measured on the basis of the pressure to be determined and is evaluated to determine the pressure to be determined.

SUMMARY OF THE INVENTION

The present invention describes a device having the features described herein and a method for manufacturing a device having the features described herein.

Correspondingly, the present invention creates a device for determining a pressure including: a housing including a cavity; a sensor device including a first sealing structure which engages directly or indirectly with the housing in such a way that an opening of the cavity is closable with the aid of the sensor device, the sensor device being configured for the purpose of determining a pressure to be determined which is applied to the cavity; and a sealing device which is situated at least partially between the housing and the sensor device and which is configured for the purpose of pressing the first sealing structure directly or indirectly on the housing by exerting a contact force on the sensor device.

The pressure to be determined is in particular a pressure of a fluid which is introducible into the cavity and to which the pressure to be determined is applied, and through which the pressure to be determined is also applied to the cavity. The housing of the device may be designated as a pressure socket.

The sealing device and the sensor device may be designated as join partners. An opening of the cavity is understood to be a fluid connection from the cavity to an exterior of the device. A fluid connection is understood as a path which a fluid may follow in order to arrive from one location to another location.

Furthermore, a method for manufacturing a device for determining a pressure is created by the present invention including the steps: configuring a housing including a cavity; configuring a sensor device including a first sealing structure; applying the sensor device to the housing in such a way that the first sealing structure engages or is engaged directly or indirectly with the housing in such a way that an opening of the cavity is closable or is closed with the aid of the sensor device; and situating a sealing device at least partially between the housing and the sensor device in such a way that the sealing device presses the first sealing structure directly or indirectly on the housing by exerting a contact force on the sensor device.

The finding underlying the present invention is that manufacturing a pressure sensor made from multiple parts advantageously enables a separate and, with respect to the necessary manufacturing cost, optimized production of the individual parts. Moreover, the individually manufactured parts may be or are connected to one another in such a way that any deformation of the parts determining the pressure is minimized. Often, for example, new part accuracies of approximately 0.5% FS (full scale) are required for high-pressure sensors. In order to achieve such accuracies, it is advantageous that a displacement of a zero signal of the pressure sensor, i.e., the device for determining the pressure, does not occur during the joining of the individual parts of the pressure sensor.

Furthermore, the device according to the present invention does without weld seams which are subjected to tension, which increases the strength of the device. In addition, the construction method of the device according to the present invention ensures an enhanced mechanical decoupling of the sensor device of the device from external influences, both during manufacturing of the device and also during installation or assembly of the device at the site of operation.

Furthermore, the advantages described herein of the device according to the present invention are independent of the exact methods used for manufacturing the sensor device of the device. In the following, a specific embodiment having a thin-film based measuring unit of the sensor device is described, which represents one example of many.

Advantageous specific embodiments and refinements arise from the further descriptions herein and from the description with reference to the figures.

According to one refinement, the sensor device has a diaphragm which is connected to the cavity and additionally has a measuring unit which is configured for the purpose of determining the pressure to be determined, this pressure being applied to the cavity, based on a deformation of the diaphragm. The measuring unit may, in particular, include a Wheatstone bridge. The diaphragm is, for example, made of steel and/or may be configured as a thinned section of a one-piece base body of the sensor device, which may, for example, be made of steel. Thus, a particularly precise determination of the pressure to be determined is possible.

According to another specific embodiment, the sealing device is attached to the housing under a pretension in such a way that the sealing device is pressed against the sensor device due to the pretension in such a way that the first sealing structure of the sensor device is pressed directly or indirectly on the housing. Thus, a tightness of the connection between the sensor device and the housing may be ensured in the cavity even when a pressure to be measured is applied at the sensor device.

According to another specific embodiment, the first sealing structure of the sensor device has a first outer cone and the housing has a first inner cone, the first outer cone being pressable in a form-locked manner on the first inner cone. Thus, a particularly tight connection is implementable between the first inner cone and the first outer cone. According to another specific embodiment, the first sealing structure of the sensor device has a sealing edge.

According to another specific embodiment, the sensor device has a second sealing structure, which is configured to sealingly cooperate with a third sealing structure of the sealing device, the second sealing structure of the sensor device having a second inner cone, and the third sealing structure of the sealing device having a second outer cone which may engage with the second inner cone. In other words, the second inner cone is pressable pressure-tight into the second outer cone. An outer cone is understood in particular to be a lateral surface of a cone-shaped or cone section-shaped recess in an element. An inner cone is understood in particular to be a lateral surface of a cone-shaped or cone section-shaped outer surface of an element.

According to another specific embodiment, the sealing device is at least partially, which may be completely, situated in a blind hole in the housing. Thus, a particularly compact structure may be implemented in which, additionally advantageously, a pretension is enabled between the housing, the sealing device, and the sensor device. For this purpose, the sealing device may be advantageously fixed with the aid of a weld seam on the housing, in particular in the blind hole.

According to another specific embodiment of the method according to the present invention, the sealing device is pressed into a blind hole in the housing during the arrangement of the sealing device for exerting the contact force on the sensor device in such a way that a pretension exists at least between the sealing device and the sensor device.

According to another specific embodiment, the sealing device is joined, which may be pressed into a blind hole in the housing during the arrangement of the sealing device to exert the contact force on the sensor device, and is fixed on the housing with the aid of a weld seam.

The present invention is subsequently explained in greater detail based on exemplary embodiments shown in the schematic figures of the drawings.

In all figures, similar or functionally similar elements and devices—unless otherwise indicated—are provided with the same reference numerals. The numbering of the method steps is used for clarity and should in particular not imply, unless otherwise indicated, a specific, chronological sequence. In particular, multiple method steps may also be carried out simultaneously.

DETAILED DESCRIPTION

Figure 1:
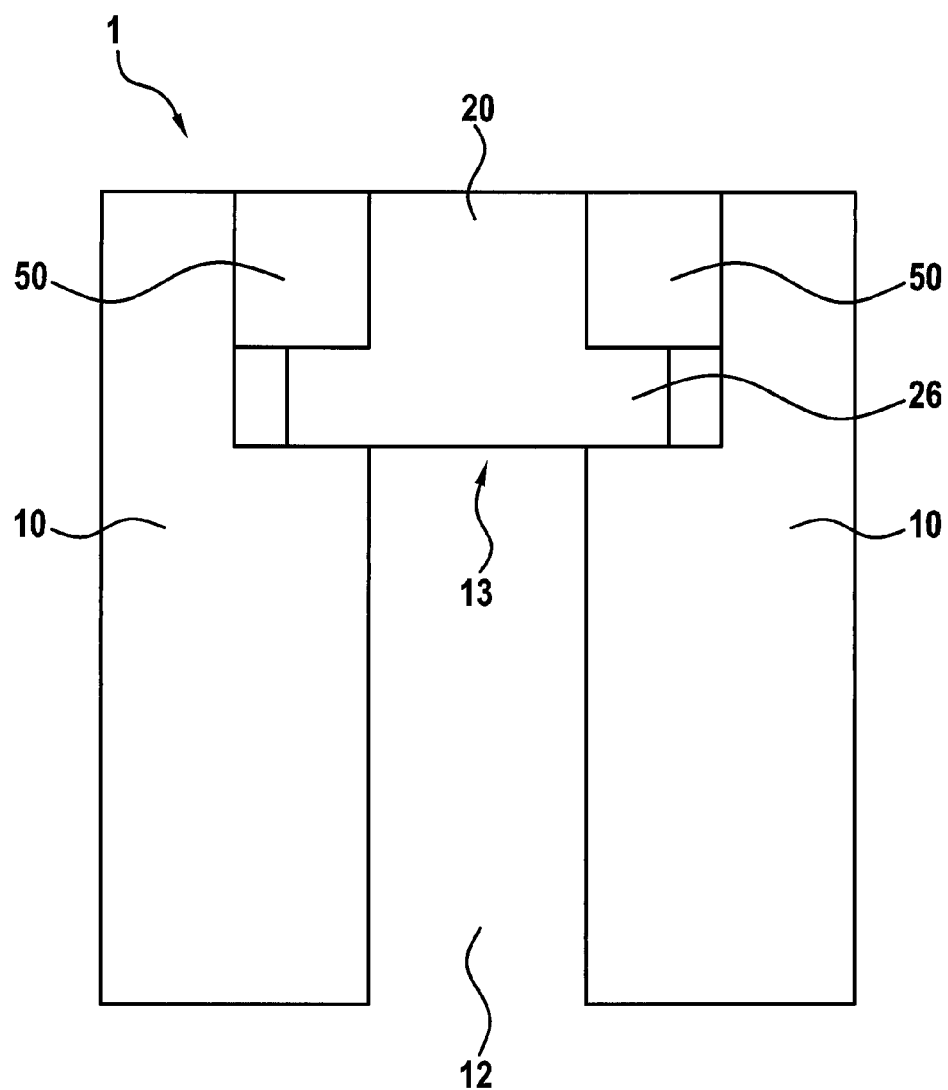
FIG. 1 shows a schematic block diagram of a device 1 for determining a pressure according to a specific embodiment of the present invention.

FIG. 1 shows a schematic block diagram of a device 1 for determining a pressure according to a specific embodiment of the present invention.

Device 1 has a housing 10 including a cavity 12, which has an opening 13 which leads from cavity 12 to an exterior side of housing 10. Device 1 further includes a sensor device 20 including a first sealing structure 26. First sealing structure 26 is situated directly or indirectly engaged with housing 10 in such a way that opening 13 of cavity 12 is closed or is closable by sensor device 20.

Sensor device 20 is configured for the purpose of determining a pressure to be determined, this pressure being applied to the cavity, for example in that a fluid to which the pressure is applied is introduced or has been introduced into the cavity.

Device 1 additionally has a sealing device 50, which is situated at least partially, which may be entirely, between housing 10 and sensor device 20, and which is configured for the purpose of pressing first sealing structure 26 directly or indirectly on housing 10 by exerting a contact force on sensor device 20 for pressure-tight closing of opening 13.

Sensor device 20, sealing device 50, and housing 10 may be elements which are manufactured separately from one another, which means that no two of the three elements are manufactured as one piece with another.

Figure 2:
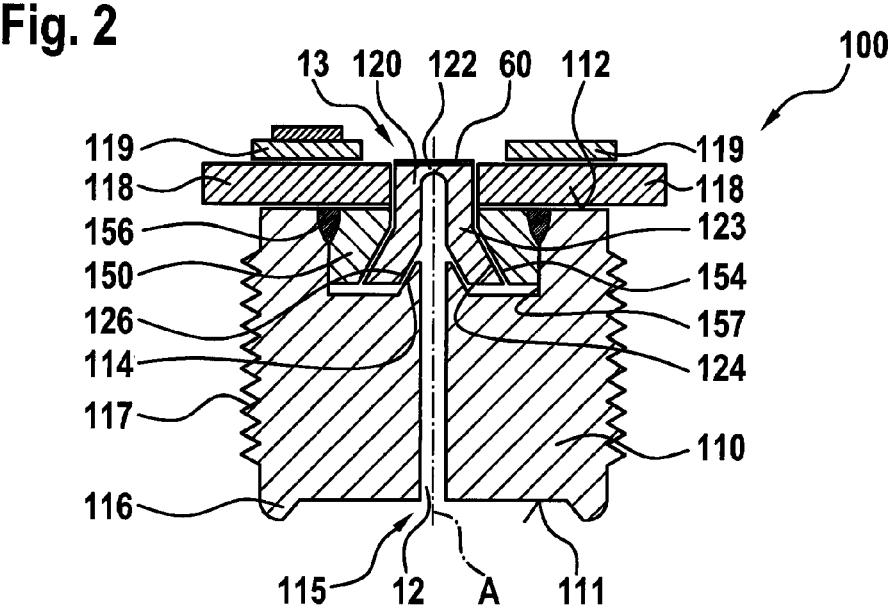
FIG. 2 shows a schematic cross-sectional view of a device 100 for determining a pressure according to another specific embodiment of the present invention.

FIG. 2 shows a schematic block diagram of a device 100 for determining a pressure according to another specific embodiment of the present invention.

Device 100 is a variant of device 1. Sensor device 120 of device 100 includes a diaphragm 122, which is part of a one-piece base body 123 of sensor device 120. Base body 123 may be made of steel. Diaphragm 122 may be formed, for example, by drilling base body 123 so that a thinner section, in comparison to the remaining part of base body 123, is created as diaphragm 122. A measuring unit 60 is configured for the purpose of determining a pressure based on a deformation of diaphragm 122 on a first outer surface of diaphragm 122, which faces away from cavity 12. Measuring unit 60 of device 100 will be subsequently described in greater detail with reference to FIG. 5.

Base body 123 of sensor device 120 is configured to be rotationally symmetrical with respect to a rotational symmetry axis A which intersects diaphragm 122, in particular standing perpendicularly on diaphragm 122. Anywhere in the following, where an axial, tangential, or radial direction is discussed, it is always to be understood as defined with respect to rotational symmetry axis A.

Base body 123 additionally has a first outer cone 126 as the first sealing structure, which means a cone-shaped section of an outer surface of base body 123 facing toward housing 110 of device 100, the first outer cone 126 expanding increasingly in the axial direction at increased distance in the radial direction from diaphragm 122. Housing 110 of device 100 has a first inner cone 114, which faces sensor device 120, surrounds first opening 13, and is rotationally symmetrical with respect to the rotational symmetry axis A. Cavity 12 is configured as a rotationally symmetrical through hole with respect to rotational symmetry axis A. Cavity 12 has, on its end diametrically opposite opening 13 in the axial direction, a second opening 115 in a first outer side 111 of housing 110, via which the pressure to be measured may be applied to cavity 12. First inner cone 114 is engaged with first outer cone 126 in such a way that first opening 13 of cavity 12 is closable by sensor device 120, diaphragm 122 of sensor device 120 being in connection to cavity 12.

Base body 123 of sensor device 120 has a second sealing structure, which is configured as a second inner cone 124 coaxial to rotational symmetry axis A and to first outer cone 126, and is formed around first outer cone 126 in the radial direction.

First opening 13 and first inner cone 114 of cavity 12 are situated within a blind hole 157 which is formed in the axial direction on a second outer side 112 of housing 110 facing away from first outer side 111 of housing 110. In device 100, sealing device 150, which is formed rotationally symmetrical to rotational symmetry axis A, is situated completely within blind hole 157.

Sealing device 150 is joined in blind hole 157 and, with a pretension in the direction of first outer side 111 of housing 110, fixed with the aid of a weld seam 156 on housing 110. Sealing device 150 has a second outer cone 154 at a through hole of sealing device 150, through which sensor device 120 is at least partially guided. Second outer cone 154 is configured in such a way that it may engage in a form-locked manner with second inner cone 124 of sensor device 120.

Furthermore, the pretension, under which sealing device 150 is welded to housing 110, is selected in such a way, and sealing device 150 is introduced into blind hole 157 in such a way, that second outer cone 154 is initially pressed in the radial direction on second inner cone 124. Due to the pressing in the radial direction, a contact force is generated with a component perpendicular to the lateral surface of second outer cone 124, and thus, in device 100, also perpendicular to the lateral surface of first outer cone 126 and first inner cone 114. Thus, due to the pretension, with which sealing device 150 is fixed to housing 110, first outer cone 126 is pressed on first inner cone 114, and thus sensor device 120 is pressed on housing 110, whereby opening 13 is closed pressure-tight.

Sealing device 150 is particularly advantageously pressed into blind hole 157 and then welded, the contact force being selected in such a way that, as described above, a desired pretension is implemented. This procedure has the particular advantage that the pressing and the welding may be carried out in two separate production steps, whereby the manufacturing cost may be reduced.

The pretension is adjusted advantageously in such a way that a net amount of the contact force acting in the direction of first outer side 111 is then also sufficient for a pressure-tight connection between sensor device 120 and housing 110, when sensor element 120 is pressed away from housing 110 by the applied pressure to be determined in cavity 12.

On an outer side facing away from cavity 12, housing 110 has an inner thread 117 with the aid of which housing 110 is screwable as a pressure socket, for example, into an injection system, for example, into a fuel injection system of a vehicle. On the first outer side 111 of housing 110, which is designatable as the pressure-side end, a sealing edge 116 of housing 110 is formed with the aid of which a pressure-tight connection may be established during the assembly of housing 110 into a system. On one end of housing 110 in the axial direction next to diaphragm 122, a cover 118 is provided, through which measuring unit 60 is contactable. On a side of cover 118 facing away from housing 110, a circuit board 119 may be situated, with the aid of which data signals may be evaluated and/or transmitted by measuring unit 60.

Figure 3:
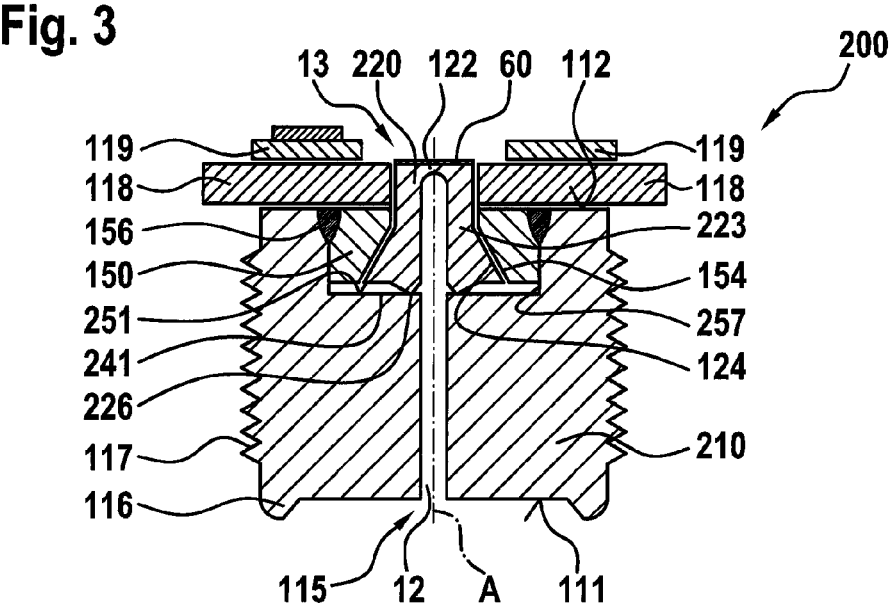
FIG. 3 shows a schematic cross-sectional view of a device 200 for determining a pressure according to another specific embodiment of the present invention.

FIG. 3 shows a schematic cross-sectional view of a device 200 for determining a pressure according to another specific embodiment of the present invention. Device 200 is a variant of device 100 according to FIG. 2, which differs from device 100 in the configuration of sensor device 220 and housing 210.

In device 200, sensor device 220 has, instead of a first outer cone 126, a sealing edge 226 directed in the direction of second opening 115 as a first sealing structure which is formed rotationally symmetrically around rotational symmetry axis A. Blind hole 257 of device 200 does not have a first inner cone 114 around opening 13, but instead is formed as a flat bottom surface 251 so that sealing edge 226, together with flat bottom surface 251 of blind hole 257 of housing 210, establishes a pressure-tight connection due to the contact force which sealing device 150 exerts on sensor device 220.

Figure 4:
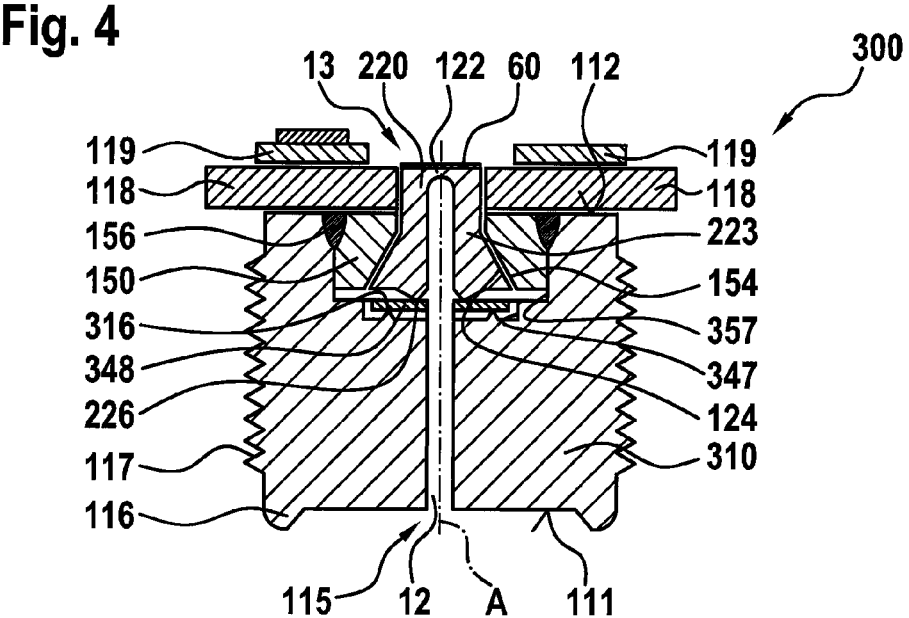
FIG. 4 shows a schematic cross-sectional view of a device 300 for determining a pressure according to another specific embodiment of the present invention.

FIG. 4 shows a schematic cross-sectional view of a device 300 for determining a pressure according to another specific embodiment of the present invention. Device 300 is a variant of device 200 according to FIG. 3, which differs from device 200 in the configuration of housing 310.

In device 300, an additional second blind hole 347, rotationally symmetrical to rotational symmetry axis A, is formed in blind hole 357 and a sealing ring 348 is inserted into second blind hole 347. Sealing edge 226 of sensor device 220 engages pressure-tight with sealing ring 348 due to the pretension, i.e., due to the contact force exerted by sealing device 150 on sensor device 220.

Furthermore, an additional sealing edge 316 is formed on housing 310 which engages pressure-tight with sealing ring 348. Additional sealing edge 316 may be formed on a bottom surface of second blind hole 347, encompassing opening 13 and facing toward sensor device 220, on which rotational symmetry axis A stands perpendicularly. Sealing ring 348 is rotationally symmetrical to rotational symmetry axis A and which may be metallically deformable by sealing edges 226, 316. Due to the recess in the radial center of sealing ring 348, diaphragm 122 is again in contact with cavity 12.

Figure 5:
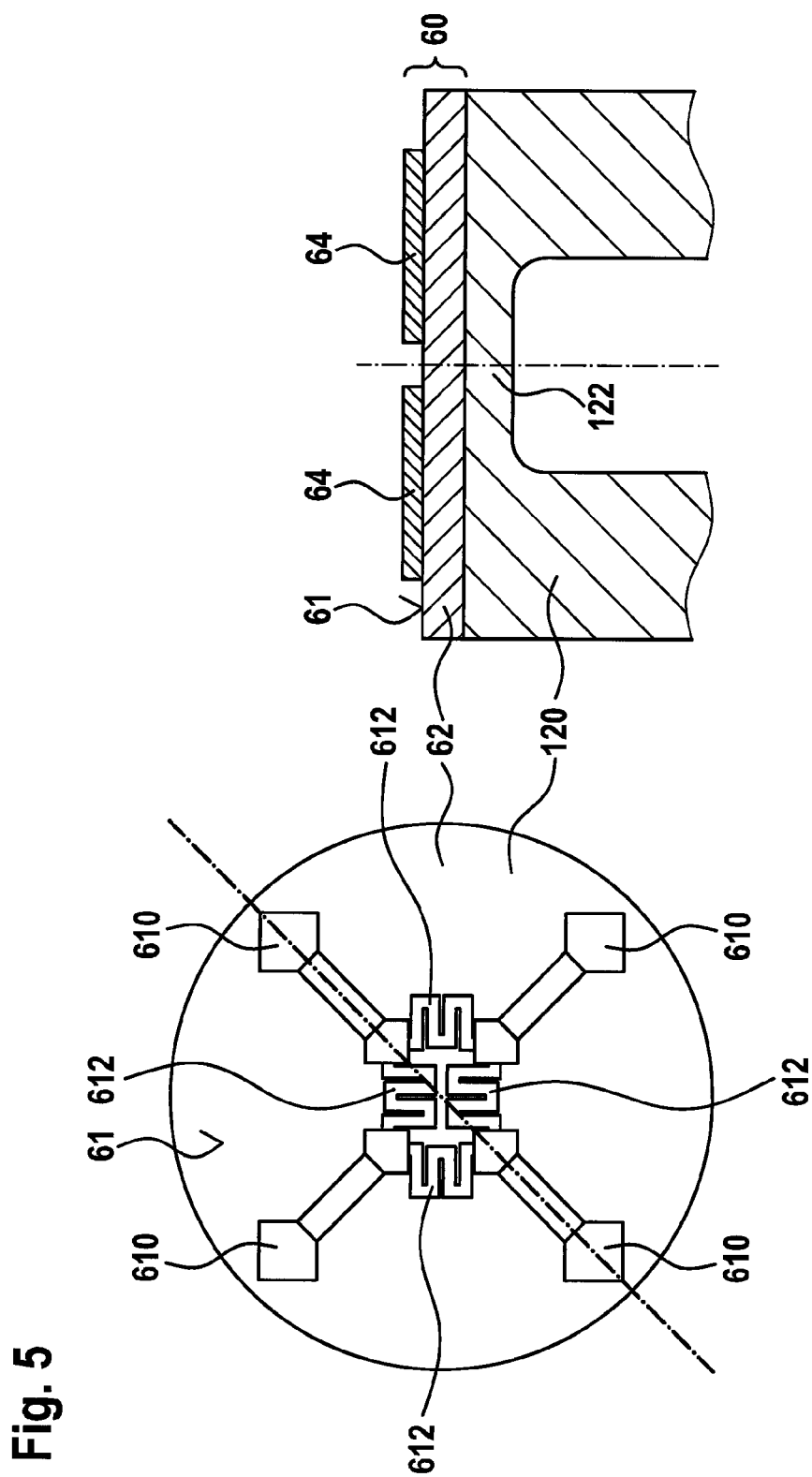
FIG. 5 shows schematic detail views of the sensor device 120 of the device 100 from FIG. 2.

FIG. 5 shows schematic detail views of sensor device 120 of device 100 from FIG. 2. On the left, FIG. 5 shows a schematic top view in the direction of first outer surface 111 of housing 110 toward second outer surface 112 of the housing, and on the right, a schematic cross-sectional view through a part of sensor device 120.

On an outer side 61 of sensor device 120 facing away from housing 110, measuring unit 60 is situated and is formed as a thin film structure according to FIG. 5. The thin film structure includes an insulating layer 62 and a functional layer 64, for example silicon oxide, or is made thereof. All piezo-resistant materials, for example, nickel-chromium alloys, platinum, polysilicon, titanium oxynitride, etc., may be used as functional layer 64.

At least four resistors 610 are structured in functional layer 64, for example during the manufacturing method according to the invention, for example by wet etching, dry etching, laser deposition, etc. Resistors 610 are interconnected to form a Wheatstone bridge and have a meander-shaped area 612 so that electrical resistances of resistors 610 change due to deformations, in particular expansions, of diaphragm 122. Electrical supply lines to the Wheatstone bridge and contact surfaces may be configured in the plane of functional layer 64 or in an additional metallization plane. In addition, the functional layer may be protected by a passivation layer, e.g. silicon nitride, or other measures, e.g., by gelling.

Circuit board 119 may have an evaluation circuit, with the aid of which a voltage may be evaluated at the Wheatstone bridge and, based on this, an output signal proportional to the pressure to be determined may be provided in the form of a voltage, e.g., from zero to five volts, or in the form of a current, e.g., from four to twenty milliamperes, or in digital form. The output signal may be tapped at the circuit board and may be guided outwardly, for example with the aid of a suitable plug which forms an upper part of cover 118.

Figure 6A:
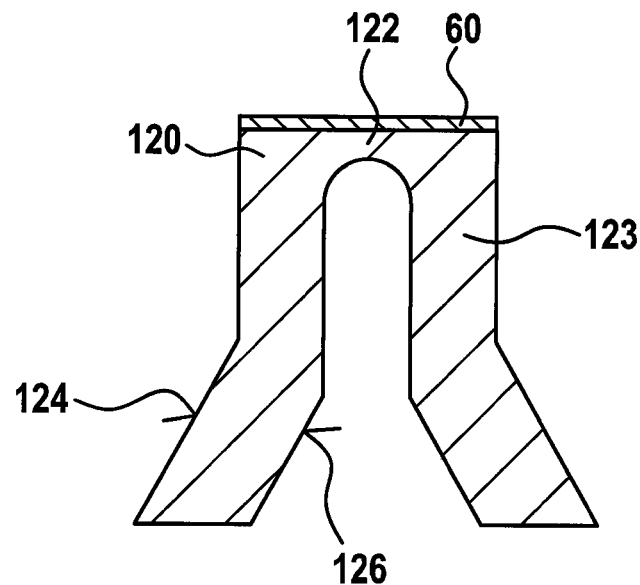
FIGS. 6a, 6b and 6c show schematic cross-sectional views through different possible sensor devices 120; 220; 520 of the device according to the present invention.
Figure 6B:
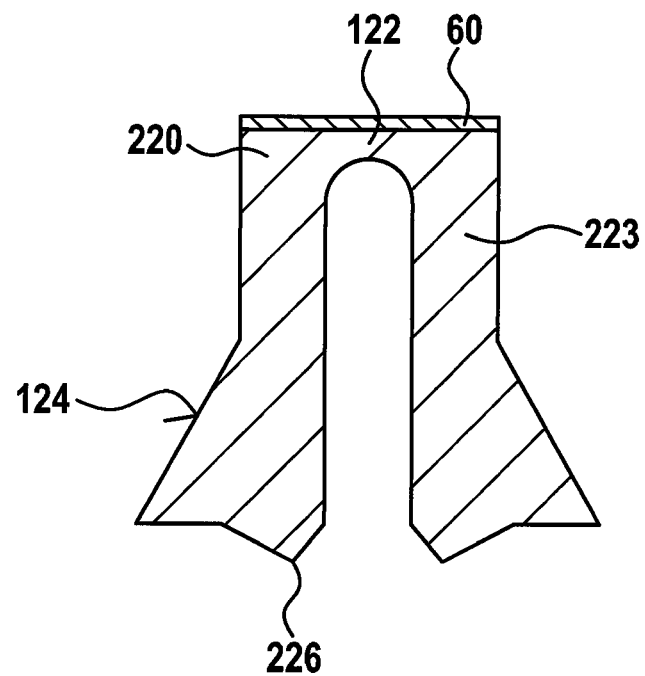
Figure 6C:
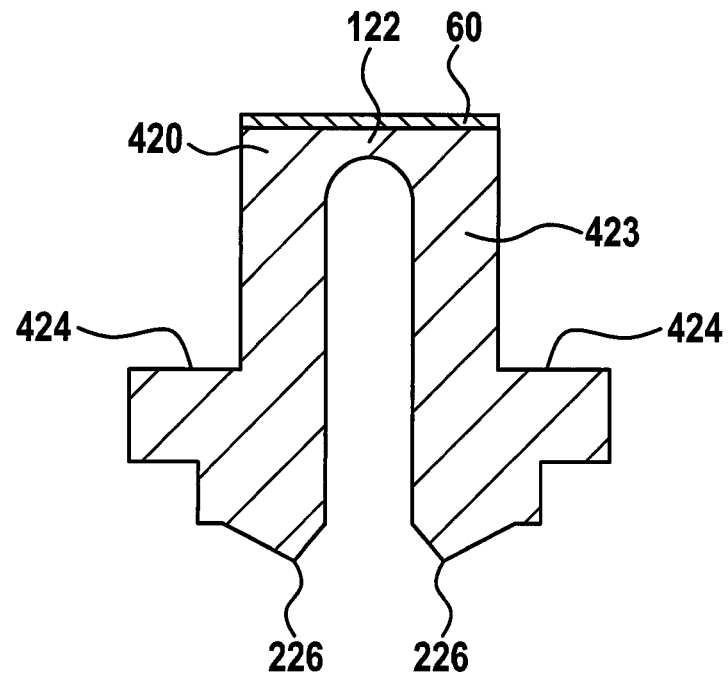

FIGS. 6a) through 6c) show schematic cross-sectional views through different possible sensor devices 120, 220, 420 of the device according to the present invention. FIG. 6a) shows base body 123 of sensor device 122 from FIG. 2. FIG. 6b) shows base body 223 of sensor device 220 from FIGS. 3 and 4. FIG. 6c) shows another possible form of a base body 423 of a sensor device 420, which has a step 424 as a second sealing structure, against which step a sealing device formed with a corresponding recess may be pressed.

Figure 7:
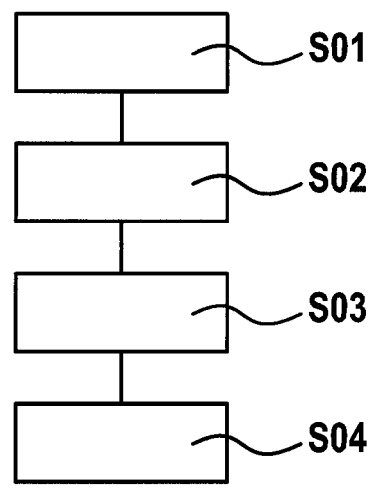
FIG. 7 shows a schematic flow chart for explaining a method according to the present invention for manufacturing a device for determining a pressure.

FIG. 7 shows a schematic flow chart for explaining a method according to the present invention for manufacturing a device for determining a pressure. The manufacturing method is particularly suited for manufacturing device 1; 100; 200; 300 and was already explained in part in detail with reference to FIGS. 1 through 6c). In particular, the manufacturing method is adaptable to all variants and refinements described in relation to the device according to the invention.

In a step S01, a housing 10; 110; 210; 310 is provided with a cavity 12. In a step S02, a sensor device 20; 120; 220; 420 is provided with a first sealing structure 26; 126; 226. In a step S03, sensor device 20; 120; 220; 420 is attached to housing 10; 110; 210; 310 in such a way that first sealing structure 26; 126; 226 may engage directly or indirectly with housing 10; 110; 210; 310 in such a way that an opening 13 of cavity 12 is closable with the aid of sensor device 20; 120; 220; 420.

In a step S04, a sealing device 50; 150 is situated at least partially between housing 10; 110; 210; 310 and sensor device 20; 120; 220; 240 in such a way that sealing device 50; 150 presses first sealing structure 26; 126; 226 directly or indirectly on housing 10; 110; 210; 310 by exerting a contact force on sensor device 20; 120; 220; 420.

Sealing device 150 may be pressed into blind hole 157; 257; 357 in housing 110; 210; 310 in step S04 in such a way that a pretension prevails at least between sealing device 50; 150 and sensor device 20; 120; 220. Sealing device 150 may be fixed on housing 110; 210; 310 which may be with the aid of a weld seam 156, in particular with a weld seam 156 inside of blind hole 157.

Although the present invention was previously described based on the exemplary embodiments, it is not limited thereupon but instead may be modified in many ways. In particular, the present invention may be changed or modified in many ways without departing from the core of the present invention.

What is claimed is:

1. A device for determining a pressure, comprising:
    a housing including a cavity;
    a sensor device including a first sealing structure which engages directly or indirectly with the housing so that an opening of the cavity is closable with the sensor device, the sensor device being configured to determine a pressure to be determined, which is applied to the cavity; and
    a sealing device situated at least partially between the housing and the sensor device and which is configured to press the first sealing structure directly or indirectly on the housing by exerting a contact force on the sensor device, wherein the first sealing structure of the sensor device includes a first outer cone, and the housing includes a first inner cone, the first outer cone being pressable in a form-locked manner on the first inner cone.

2. The device of claim 1, wherein the sensor device includes a diaphragm which is connected to the cavity, and a measuring unit configured to determine the pressure to be determined, which is applied to the cavity, based on a deformation of the diaphragm.

3. The device of claim 1, wherein the sealing device is attached to the housing under pretension so that the sealing device is pressed against the sensor device due to the pretension so that the first sealing structure of the sensor device is pressed directly or indirectly on the housing.

4. The device of claim 1, wherein the first sealing structure of the sensor device has a sealing edge.

5. The device of claim 1, wherein the sensor device includes a second sealing structure configured to sealingly cooperate with a third sealing structure of the sealing device, the second sealing structure of the sensor device including a second inner cone, and the third sealing structure of the sealing device including a second outer cone with which the second inner cone is engageable.

6. The device of claim 1, wherein the sealing device is situated at least partially in a blind hole in the housing.

7. A method for manufacturing a device for determining a pressure, the method comprising:
    forming a housing including a cavity;
    forming a sensor device including a first sealing structure;
    attaching the sensor device to the housing so that the first sealing structure is engageable directly or indirectly with the housing so that an opening of the cavity is closable with the sensor device; and
    arranging a sealing device at least partially between the housing and the sensor device so that the sealing device presses the first sealing structure directly or indirectly on the housing by exerting a contact force on the sensor device, wherein the first sealing structure of the sensor device includes a first outer cone, and the housing includes a first inner cone, the first outer cone being pressable in a form-locked manner on the first inner cone.

8. The method of claim 7, wherein the sealing device is pressed into a blind hole in the housing during the arrangement of the sealing device to exert the contact force on the sensor device so that at least a pretension prevails between the sealing device and the sensor device.

9. The method of claim 7, wherein the sealing device is fitted into a blind hole in the housing and fixed on the housing with a weld seam during the arrangement of the sealing device to exert the contact force on the sensor device.

* * * * *